June 29, 1943.  W. A. EATON  2,323,208
BRAKE MECHANISM
Filed May 26, 1941  3 Sheets-Sheet 1
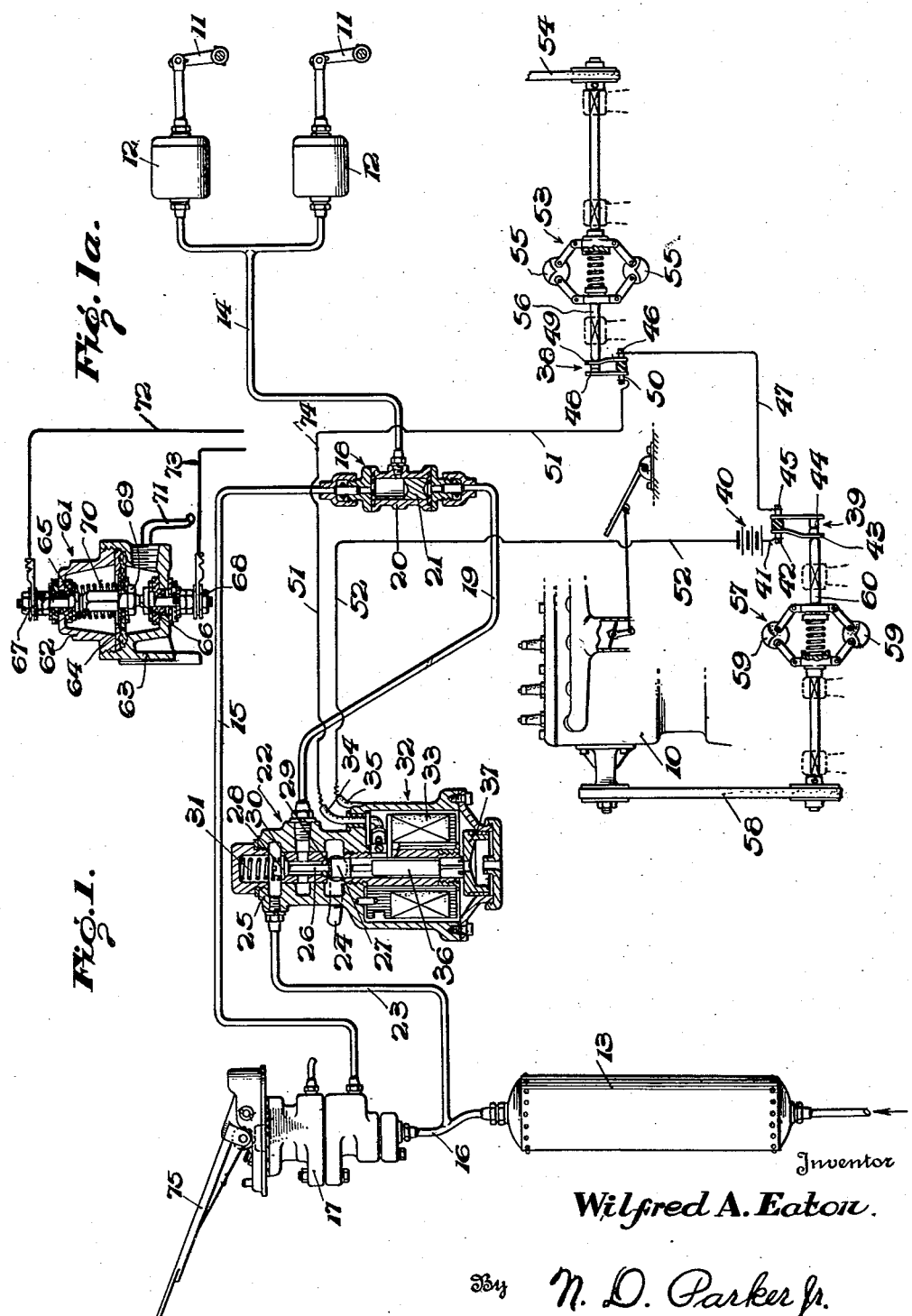
Inventor
*Wilfred A. Eaton*
By *N. D. Parker Jr.*
Attorney

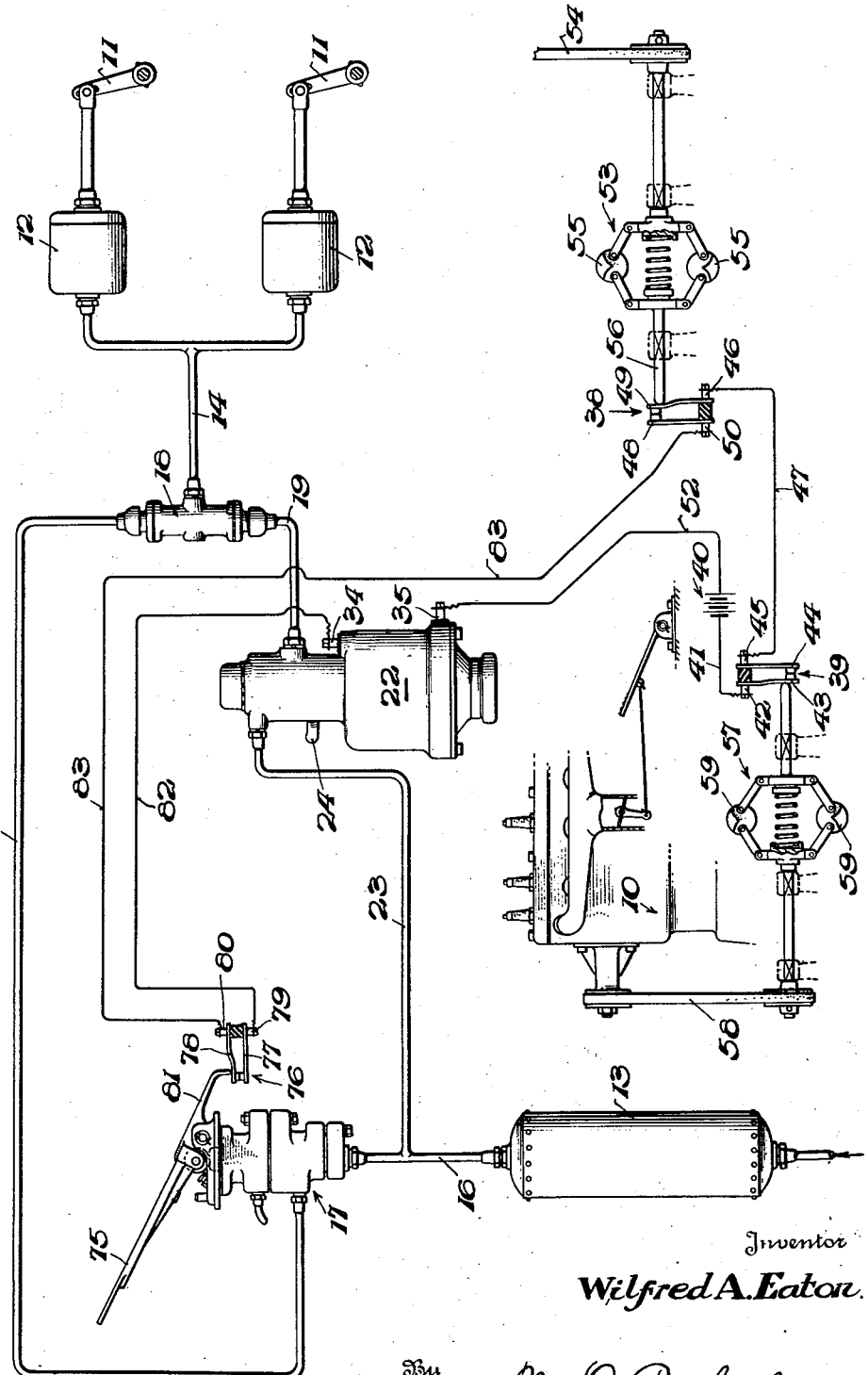

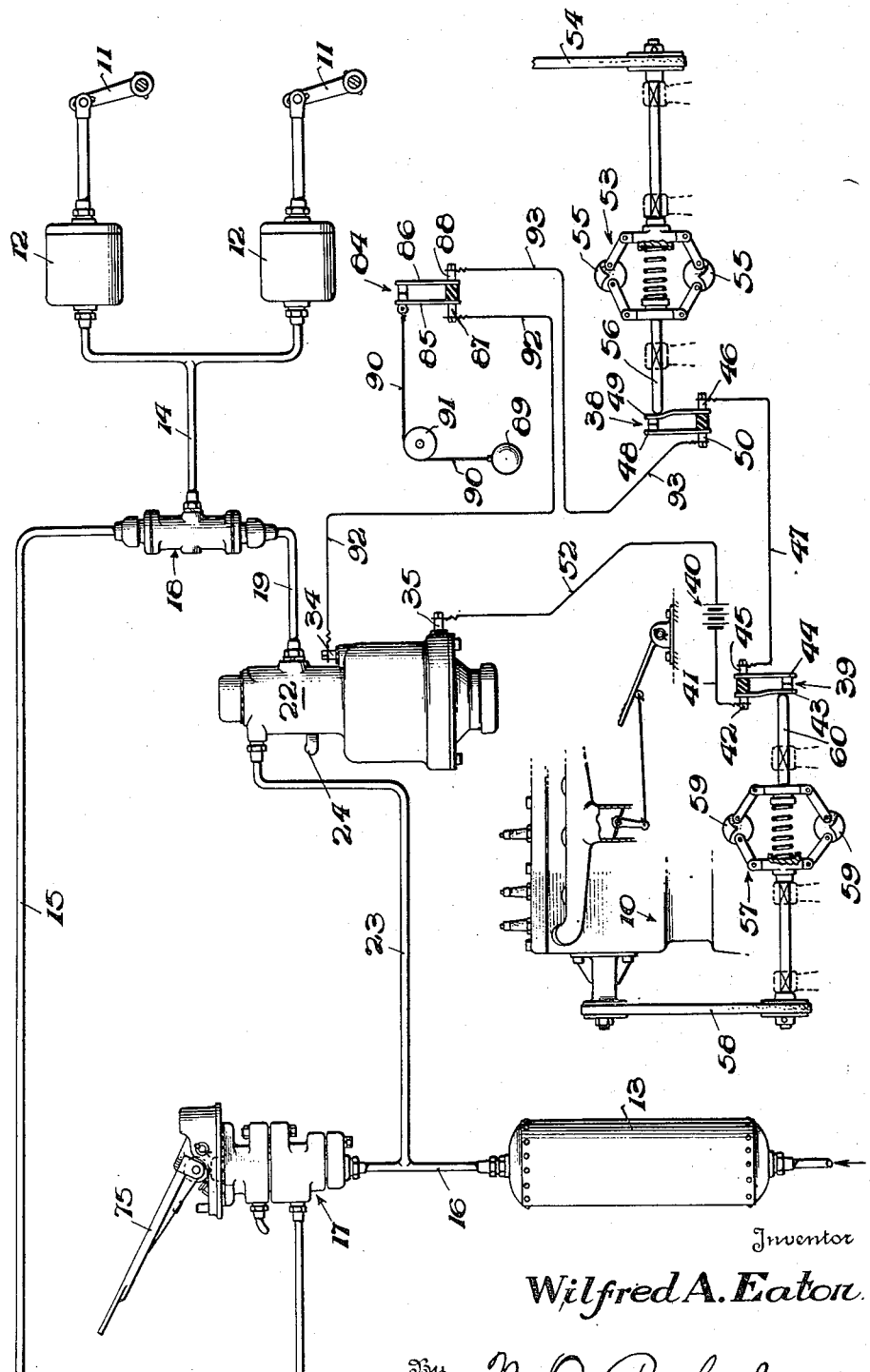

Patented June 29, 1943

2,323,208

UNITED STATES PATENT OFFICE 2,323,208

BRAKE MECHANISM

Wilfred A. Eaton, Pittsburgh, Pa., assignor to Bendix-Westinghouse Automotive Air Brake Company, Pittsburgh, Pa., a corporation of Delaware Application May 26, 1941, Serial No. 395,263

17 Claims. (Cl. 188—152)

This invention relates to vehicle braking systems and more particularly to a construction whereby the operator can hold the brakes applied under certain conditions and without the use of the usual brake pedal.

One of the objects of the present invention is to provide a novel arrangement for automatically maintaining the brakes of a vehicle applied under certain conditions of operation, the construction being such that the brakes may be kept in applied position without the necessity of the operator maintaining his foot upon the brake pedal. Such a construction greatly facilitates the operation and control of motor vehicles under crowded traffic conditions and avoids the tendency of the vehicle to roll down hill after a stop and during the time when the operator changes his foot from the brake pedal to the accelerator pedal when proceeding forwardly after such stop.

Another object is to provide a novel construction of the above character wherein the vehicle braking system will be automatically maintained in applied position as soon as the vehicle has been brought to rest by the manipulation of the usual brake pedal, such an arrangement permitting the operator to thereafter remove his foot from such pedal while keeping the vehicle brakes in an applied position.

In automotive braking systems of the character generally outlined above, it has been found that, under certain operating conditions, the automatic application of the brakes may occur when the same is not desired. For example, when the vehicle is operating on a slippery pavement and the brakes are applied to retard the speed thereof, the vehicle wheels may become locked by such operation and the vehicle is thus caused to skid. Under such conditions, and in the case of fluid pressure operated brakes, the auxiliary braking system may be caused to operate to supply reservoir pressure to the brake actuator and maintain the brakes in such locked position.

Therefore, it is another object of the invention to provide, in a system of the above character, a novel apparatus for overcoming the possible disadvantages enumerated heretofore.

Still another object is to provide a fluid pressure braking system of the above character so constructed that the auxiliary system will not operate when the brakes are applied to a degree to lock the vehicle wheels and thus cause the vehicle to skid.

A further object is to provide a braking system of the foregoing character wherein operation of the auxiliary braking system is dependent upon the acceleration of the vehicle.

A still further object is to provide a novel controlling mechanism of the above type which may be especially adaptable for motor vehicles equipped with fluid pressure braking systems.

Other objects and novel features of the invention will appear more fully hereinafter from the following detailed description when taken in connection with the accompanying drawings, wherein a plurality of embodiments of the invention are illustrated. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a diagrammatic view, partly in section, of a vehicle controlling mechanism constructed in accordance with the present invention;

Fig. 1a is a sectional view of a pressure responsive switch which may be employed in the mechanism of Fig. 1;

Fig. 2 is a diagrammatic view of a modified form of the invention, and

Fig. 3 is a diagrammatic view of still another modification.

Referring more particularly to Fig. 1, a vehicle controlling mechanism constructed in accordance with the principles of the present invention is illustrated therein in combination with a motor vehicle having an engine 10 and brake system 11, 11. Preferably, the brake system is controlled by fluid actuators 12, 12, a source of compressed air 13 being provided for energizing the actuators. While the use of compressed air for actuating the brake system is illustrated in the drawings and will be referred to in the following description, it is to be understood that any suitable source of fluid power may be employed, such as liquid under pressure or the vacuum from the intake manifold of the engine.

In order to control communication between the brake actuators 12, 12 and the source or reservoir 13, these devices are connected by conduits 14, 15 and 16, a manually operable controlling valve 17 forming the connection between conduits 15 and 16. The valve mechanism 17 may be constructed in any suitable manner but is preferably constituted as disclosed in the patent to William J. Andres and Roy S. Sanford, No. 2,133,275, granted October 18, 1938, for Control mechanism. Interposed between conduits 14 and 15 is a double check valve 18 in order to permit flow of fluid pressure to the conduit 14 from either conduit 15 or a conduit 19, the latter being provided for a purpose which will appear more fully hereinafter. As shown, the check valve 18 includes a casing 20 housing a valve element 21 movable to one extremity or the other in the casing 20 in order to interconnect conduits 14 and 15 or conduits 14 and 19.

The present invention, as illustrated in Fig. 1, provides a supplemental means for applying the brakes under certain conditions of vehicle operation and independently of the released position of the valve mechanism 17. Preferably, such independent brake-applying and releasing means is effective to apply the brakes when the motion of the vehicle has been arrested and the engine is idling. With such an arrangment, control of the vehicle is greatly simplified since, under the conditions above specified, the vehicle brakes will be applied and the operator will be relieved of the necessity of keeping his foot upon the pedal of the brake valve 17. Such a construction is especially desirable for preventing the vehicle from rolling backwardly down a grade when it is desired to either arrest the motion of the vehicle because of traffic conditions or move the vehicle forwardly in first gear.

In order to provide the aforementioned auxiliary or supplementary brake-applying means, a valvular mechanism 22 is interposed between conduit 19 and a conduit 23, the latter connected with conduit 16. When the valvular mechanism is open to connect conduits 19 and 23, fluid pressure is conducted from the reservoir 13 to the brake chamber 12 by way of the double check valve 18 and conduit 14. The valve 22 is so constructed as to close the connection between conduits 23 and 19 and connect the latter to an atmospheric connection 24 in order to exhaust the brake chamber 12 under certain conditions of operation which will appear hereinafter.

Preferably, the valve 22 may take the form of any suitable type of electromagnetically controlled valvular mechanism. As shown, the valve includes a casing 25 having a valve 26 therein, the latter being provided with an exhaust head 27 and an intake head 28, respectively cooperable with seats 29 and 30. A spring 31 normally serves to maintain the valve 26 in the position shown where the intake valve head 28 is closed, while the exhaust valve head 27 is opened. Under these conditions, conduit 19 is connected to the atmospheric connection 24 while communication between conduits 23 and 19 is interrupted. The valve 26 is moved to open position by an electromagnetic solenoid 32, the latter including a coil 33 having terminals 34 and 35 and surrounding an element 36 secured to an armature 37. The construction is such that, upon energization of the coil 33, armature 37 will be drawn upwardly in order to impart opening movement to the valve 26 through element 36. Upon deenergization of the coil 33, spring 31 is effective to return the valve 26 to the position shown in Fig. 1.

Means are provided for controlling the energization of the coil 33, and, as illustrated, such means are not only responsive to the speed of the vehicle but also responsive to the speed of the engine. As shown, a switch 38 responsive to vehicle speed and a switch 39 responsive to engine speed are arranged in series circuit with the coil 33 and a source of energy such as a battery 40. Such circuit includes connection 41, connecting one side of the battery 40 with a terminal 42 of the switch 38, a pair of spring contacts 43 and 44, and a terminal 45 connected to a terminal 46 of the switch 38 by a wire 47. The switch 38 further comprises a pair of spring contacts 48 and 49 and a terminal 50 which is electrically connected to terminal 34 of the coil 33 by a wire 51. The other terminal 35 of the coil 33 has a wire 52 connected thereto which completes the electrical circuit to the other terminal of the battery 40.

Normally, when the motion of the vehicle is arrested, spring contacts 48 and 49 are closed through the action of a speed responsive governor 53 which may be drivably connected through any suitable means 54 to any driven part of the vehicle, the motion of which is arrested when the motion of the vehicle is stopped, such as, for example, the propeller shaft, not shown. As soon as the motion of the vehicle is initiated, however, the construction of the governor 53 is such that the centrifugally operable weights 55 will cause actuating member 56 to be moved to the right, as viewed in Fig. 1, in order to permit the spring contacts 48 and 49 to move to open position.

The switch mechanism 39, as above indicated, is responsive to the speed of the engine 10. Normally, when the engine is idling, spring contacts 43 and 44 are closed through the action of a speed responsive governor 57 which is drivably connected through any suitable means 58 to the engine 10. When the speed of the engine 10 is increased above idling speed, however, the construction of the governor 57 is such that the centrifugally operable weights 59 will cause actuating member 60 to be moved to the left, as viewed in Fig. 1, in order to permit the spring contacts 43 and 44 to move to open position.

With the construction heretofore provided, it will be understood that, with the motion of the vehicle arrested, through operation of the brake valve 17, and the engine 10 idling, the supplemental brake-applying valve 22 will be operated in order to conduct fluid pressure from the reservoir 13 to the brake actuators 12, through conduits 16, 23, 19 and 14, and thus maintain the brakes applied independently of the position of the brake valve 17.

While the foregoing apparatus is fully operative under usual driving conditions, it is nevertheless possible that the supplemental brake-applying valve 22 may be operated in the above manner when the motion of the vehicle has not been arrested, but when the speed of the driven part of the vehicle, to which the speed responsive governor 53 is drivably connected, has been arrested, with the engine 10 idling. The above situation might occur while the vehicle is operating on a slippery pavement and fluid pressure is admitted from the brake valve 17 to the brake actuators 12, 12 that will apply sufficient braking force to lock the vehicle brakes and thus prevent rotation thereof, as well as preventing rotation of the driven part of the vehicle, which in the present instance is the propeller shaft. Under these conditions, spring contacts 48 and 49 are closed, and, if the engine 10 is idling, switch 39 will also be closed. The circuit will then be completed to operate the valve 22 to supply fluid pressure from the reservoir 13 to the brake actuators 12, 12. The brakes are thus fully applied, while the effect desired, upon operation of the brake valve 17, was only to retard the motion of the vehicle.

In order to avoid the possible disadvantageous operation discussed above, the present invention provides an additional switch mechanism that operates in response to fluid pressure admitted to the system by the brake valve 17 for controlling the valve 22 in cooperation with the switches 38 and 39. Such means, as disclosed in Fig. 1a, includes a switch mechanism 61 having upper and lower casing sections 62 and 63 confining a pressure responsive element, such as a diaphragm 64, therebetween. Members 65, 66 are mounted in and insulated from the respective casing sections 62 and 63 by any suitable insulating material and are provided with terminals 67 and 68 respectively. A contact 69 is secured to the diaphragm 64 and is normally held in engagement with the contact 66 by means of a spring 70, the latter also providing an electrical connection between the member 65 and contacts 69, whereby, when the switch mechanism 61 is in the normal position as shown, the terminals 67 and 68 are electrically interconnected. When the switch mechanism 61 is incorporated in the system shown in Fig. 1, fluid pressure from the conduit 15 is conducted to the switch mechanism 61 through a conduit 71 connected to the conduit 15 and is adapted to act therein on the diaphragm 64 in opposition to the spring 70. When fluid pressure acts upon the diaphragm 64, of sufficient value to overcome the action of the spring 70, the diaphragm 64 moves upwardly, contacts 66 and 69 are opened and the electrical connection between the terminals 67 and 68 is broken. Also, the switch mechanism 61 is connected in series in the aforementioned circuit which includes the valve 22 and the speed responsive switches 38 and 39. As disclosed, terminal 67 is electrically connected to the switch 38 by means of a wire 72, and the contact 34 of the valve 22 is electrically connected to the terminal 68 through a wire 73. When the switch mechanism 61 is employed in the circuit in the above manner, a portion 74 of the wire 51 is omitted as will be obvious in order to form a series circuit between the various switches and the valve 22. It can be readily seen, therefore, that the utilization of the switch mechanism 61 will cause the energization of the valve 22 to be dependent upon the pressure of the fluid admitted to the system through the brake valve 17 as well as the speeds of the vehicle and the engine.

A slightly modified form of the invention is disclosed in Fig. 2. In this embodiment, the arrangement is such that the energization of the valve 22, which controls the supplementary or auxiliary braking means, is dependent upon the position of the manually operable member 75 of the brake valve 17, as well as the speeds of the vehicle and the engine, as in the modification hereinbefore described. When the speed of the vehicle is arrested and the engine is idling, the valve 22 will not be energized until the brake valve 17 is in a fully released position. This arrangement functions to prevent operation of the auxiliary braking system when fluid pressure is admitted to the system, through the brake valve 17, that is of sufficient value to lock the vehicle brakes when the vehicle is operating on a slippery pavement.

In order to provide means for effecting the above operation, with reference to Fig. 2 of the drawings, a switch mechanism 76 is connected in series with the valve 22 and the speed responsive switches 38 and 39 and is adapted to be operated by the brake pedal 75. More particularly, the switch mechanism 76 includes a pair of spring contacts 77 and 78 having terminals 79 and 80 respectively connected thereto. In order to actuate the switch mechanism 76 in accordance with the position of the brake pedal 75, an actuating member 81 is secured to the brake pedal 75 and is adapted to contact the spring contact 78 in such a manner that the spring contacts 77 and 78 are closed when the brake pedal 75 is in a fully released position. However, when the brake pedal is moved downwardly, to operate the brake valve 17, the actuating member 81 moves away from the spring contact 78 and the contacts 77 and 78 move to open position.

The switch mechanism 76 is connected in series with the valve 22 and the speed responsive switches 38 and 39 by means of connector 82 which forms an electrical connection between terminal 79, of the switch 76, and terminal 34, of the valve 22. The terminal 80, of the switch 76, is connected to terminal 50, of the speed responsive switch 38, by means of a wire 83, and the circuit is completed to the terminal 35, of the valve 22, by means of the switch 38, wire 47, the speed responsive switch 39, wire 41, the battery 40, and the electrical connector 52. In this embodiment of the invention, in order to effect operation of the valve 22, the engine 10 must be idling and the speed of the vehicle arrested, in order to close switches 39 and 38, and the brake pedal 75 must be in the fully released position to close the switch 76 in order to complete the series circuit.

A further form of the invention is shown in Fig. 3 wherein the construction disclosed operates to prevent the application of the vehicle brakes, through the auxiliary system, when the vehicle wheels become locked due to an application of the vehicle brakes to cause the vehicle to skid. As shown, the modification includes a switch 84 that operates in response to the acceleration of the vehicle for further controlling the valve 22. More particularly, the switch 84 comprises a pair of spring contacts 85 and 86 having terminals 87 and 88 respectively connected thereto. The switch 84 is operated in response to the acceleration and deceleration of the vehicle through any suitable means, such as an inertia device, as shown, which includes a member 89 that is adapted to swing in a plane parallel to the motion of the vehicle by means of a cable 90, the latter having opposite ends thereof secured to the member 89 and the spring contact 85, and supported by a pulley 91 secured to the vehicle, so that the member 89 will be held in the position shown in Fig. 3. In such construction, when the acceleration of the vehicle is approximately zero, the spring contacts 85 and 86 are closed; however, when the acceleration of the vehicle is greater than zero, the inertia device 89 is effective to move the spring contact 85 to the left, as viewed in Fig. 3, and thus open the switch 84. A wire 92 is provided for forming an electrical connection between the terminal 34, of the valve 22, and a terminal 87 which is connected to the spring contact 85 of the switch 84. The terminal 88 of the latter is electrically connected to the terminal 35 of the valve 22 to complete the series circuit, by means of a wire 93, the switch 38, wire 47, switch 39, wire 41, the battery 40 and the electrical connector 52. In this embodiment of the invention, the valve 22 is operated when the engine 10 is idling, and the speed of the vehicle is arrested, to close switches 39 and 38 respectively, and also, when the acceleration of the vehicle is substantially zero, in which case, the switch 84 is closed to complete the series circuit.

In operation of that form of the invention disclosed in Fig. 1, it will be understood that the brake system 11 may be controlled in the usual manner by means of the brake valve 17, operation of which serves to connect reservoir 13 to brake actuators 12, 12 through conduits 16 and 15, double check valve 18 and conduit 14. In the event that the motion of the vehicle has been arrested and the speed of the engine 10 reduced to normal idling, it will be apparent that switches 38 and 39 will be closed through the respective action of the centrifugal devices 53 and 57, thus energizing coil 33 to effect upward movement of valve 26 of the valve device 22. Such operation of the valve 26 serves to supply the brake actuators 12, 12 with reservoir pressure through conduits 16, 23 and 19, double check valve 18 and conduit 14. Thus, the brakes are automatically held applied when the motion of the vehicle is arrested and the engine is idling. When it is desired to again operate the vehicle, the speed of the engine is increased and the speed responsive device 57 operates to open the switch 39. Thus, the circuit to the coil 33 is interrupted and the spring 31 acting upon the valve 26 of the valve device 22 will close the intake head 28 and open the exhaust head 27. This action will connect conduit 19 to the atmospheric connection 24 and thus the brake actuators 12, 12 will be exhausted through conduit 14, double check valve 18 and conduit 19 to atmosphere.

Referring more particularly to the operation of the arrangement disclosed in Fig. 1, when the pressure operated switch mechanism 61 of Fig. 1a is connected in the series circuit with the valve device 22, an electrical connection between the terminals 67 and 68 normally prevails; however, upon energization of the conduit 15 with fluid pressure above a predetermined value, such connection is broken. The valve mechanism 61 is so regulated that, when the presence of fluid pressure in the actuators 12, 12 approaches a value sufficient to lock the vehicle wheels when the vehicle is operating on a slippery pavement, the switch mechanism will operate to open the normally closed electrical connection between the terminals 67 and 68. Therefore, when the switch mechanism 61 is employed in the modification shown in Fig. 1, the energization of the valve 22 will be dependent upon the pressure of the fluid supplied to the actuators 12 through the brake valve 17, as well as upon the speed of the vehicle and the speed of the engine. Thus, when a brake application is made, under any condition, the valve 22 will not be operated until the pressure of the fluid in the actuators 12, 12 drops below a value that would be sufficient to supply a braking torque of such value to lock the vehicle wheels when the vehicle is operating on a wet pavement. In this arrangement, the brakes may be released by increasing the speed of the engine to open the switch 39, or by operating the brake valve 17 to supply fluid pressure to the switch mechanism 61 that will be of sufficient value to open the electrical contact therein.

With reference to the operation of the modification disclosed in Fig. 2, it will be recalled that the circuit for operating the valve 22, in order to connect the brake actuators 12 with the reservoir 13, is controlled by switches 38, 39 and 76, all arranged in series relation. Switches 38 and 39 are adapted to respectively close when the speed of the vehicle is arrested and the engine is idling. The switch 76, however, is only closed when the brake pedal 75 is in the fully released position. In such position, the actuators are connected to atmosphere through conduit 15 and the brake valve 17. In this modification, therefore, the auxiliary braking system will not operate until the operator removes his foot from the brake pedal 75, to allow the same to return to normal position. Such construction prevents the auxiliary system from operating to lock the brakes when a braking force is applied to the actuators, through operation of the brake valve 17, that is of sufficient value to lock the wheels when the vehicle in traveling on a slippery pavement, since the circuit remains open, due to the action of the switch 76, until the brake valve 17 moves to normal position. When such locking of the vehicle wheels occurs, the operator has a natural tendency to reduce the brake-applying pressure until the vehicle wheels are allowed to normally rotate. It is to be understood that such manipulation will not cause operation of the valve 22, since the switch 76 is open. When it is desired to hold the brakes applied, through operation of the valve 22, the brake pedal 75 is allowed to return to the normal position thereof, as shown in the drawing, and thus close the switch 76. The circuit is thus completed to actuate the valve 22 to allow the flow of fluid pressure to the actuators 12, 12, through conduits 16 and 23, valve 22, conduit 19, double check valve 18 and conduits 14. Such action of the valve 22 will occur immediately upon release of the brake pedal 75 and fluid pressure will be supplied to the actuators 12, through the auxiliary braking system, before the pressure of the fluid already present in the actuators is exhausted through the atmospheric connection with the brake valve 17. When it is desired to again operate the vehicle, the speed of the engine may be increased to open the switch 39, or the brake pedal may be moved from the normal position to open the switch 76. Thus, the circuit is broken and the valve 22 returns to the normal position in which conduit 19 is connected to the atmospheric port 24, to exhaust the actuators 12, 12.

In the operation of the form of the invention shown in Fig. 3, the brake system 11 may be controlled during ordinary operation of the vehicle as in the previous modifications, and also the auxiliary braking system is controlled in response to the speed of the engine and the vehicle. In this modification, however, the circuit for energizing the valve 22 is not completed until the switch 84 is closed, the latter action occurring when the acceleration of the vehicle is approximately zero. When the brakes are applied through operation of the brake valve 17 and the vehicle is caused to skid, switches 38 and 39 may thus be caused to close. However, the valve 22 will not be operated because the switch 84 will be open, since the acceleration of the vehicle will be greater than zero. When the acceleration of the vehicle is approximately zero, with the switch 38 and switch 39 closed, the switch 84 is caused to close through operation of the member 89. The valve 22 will then operate to supply fluid pressure to the actuators 12, 12. Release of the brake is effected by increasing the speed of the engine 10, to open switch 39, and thus allow the valve 22 to return to the normal position in which conduit 19 is connected to atmosphere.

There is thus provided by the present invention a series of novel arrangements for controlling the action of a vehicle braking system in such a manner that, when the motion of the vehicle has been arrested, the brakes are automatically applied and it will not be necessary for the operator to maintain his foot on the brake pedal. The invention also provides various constructions for preventing such automatic application of the brakes during certain operating conditions, mainly, when the vehicle is caused to skid due to an application of the brakes through operation of the manual control system. Such constructions, it will be readily appreciated, offer the advantages of simplified control and ease of manipulation of vehicles under crowded conditions of traffic and especially when vehicles are required to be stopped on upgrades.

While several embodiments of the invention have been disclosed herein and described with considerable particularity, it is to be understood that modifications and changes may be resorted to without departing from the spirit of the invention, as well understood by those skilled in the art. Reference will, therefore, be had to the appended claims for a definition of the limits of the invention.

What is claimed is:

1. In a motor vehicle having an engine, a fluid pressure braking system, a source of fluid pressure, a brake chamber, a brake valve for supplying fluid pressure from said source to said chamber, other means for supplying fluid pressure to said chamber from said source, a valve in said other means, means for operating the last named valve, and means directly responsive to the speed of the vehicle, and the speed of the engine for operating the last named means.

2. In a motor vehicle having an engine and a fluid pressure braking system, a source of fluid power, valve means for controlling communication between said braking system and said source, means separate from said valve means for connecting the braking system and said source, a valve in said separate means, and speed responsive means directly responsive to the speed of the vehicle and the speed of the engine for controlling operation of said valve.

3. In a motor vehicle having an engine and a fluid pressure braking system, a source of fluid power, valve means for controlling communication between said braking system and said source, means separate from said valve means for connecting the braking system and the source, a valve in said separate means, electromagnetic means for opening said valve, a circuit for controlling the electromagnetic means comprising a pair of switches arranged in series, and a pair of speed responsive devices for operating said switches, one of said devices being responsive to the speed of the engine while the other is responsive to the speed of the vehicle.

4. The combination in a motor vehicle having an engine, brakes and operator controlled means for controlling application and release of the brakes, of other means for controlling the application and release of the brakes, and means controlled by the speed of the vehicle, by the speed of the engine and by the operation of said operator controlled means for controlling the operation of said other means.

5. The combination in a motor vehicle having an engine, brakes and operator controlled means for controlling application and release of the brakes, of other means for controlling the application and release of the brakes, and means responsive to the speed of the vehicle and the speed of the engine and operable when the speed of the vehicle is arrested, when the engine is idling, and when the application of the brakes through operation of said operator controlled means is below a predetermined degree, for rendering said other means effective to apply the brakes.

6. The combination in a motor vehicle having an engine, brakes and operator controlled means for controlling application and release of the brakes, of other means for controlling the application and release of the brakes, and means responsive to the speed of the vehicle and the speed of the engine and operable when the speed of the vehicle is arrested, when the engine is idling, and when said operator controlled means is in a predetermined position for rendering said other means effective to apply the brakes.

7. The combination in a motor vehicle having an engine, brakes and operator controlled means for controlling application and release of the brakes, of other means for controlling the application and release of the brakes, and means responsive to the speed of the vehicle and the speed of the engine and operable when the speed of the vehicle is arrested, when the engine is idling, and when said operator controlled means is in a fully released position for rendering said other means effective to apply the brakes.

8. In a motor vehicle having an engine, a fluid pressure braking system, a source of fluid pressure, a brake chamber, a brake valve for supplying fluid pressure from said source to said chamber, other means for supplying fluid pressure to said chamber from said source, a valve in said other means, means for operating the last named valve, and means responsive to the speed of the vehicle, the speed of the engine, and the fluid pressure supplied to said chamber through said brake valve for operating the last named means.

9. In a motor vehicle having an engine and a fluid pressure braking system, means for controlling application and release of the brakes, other means for controlling the application and release of the brakes, and means dependent upon the speed of the engine, the speed of the vehicle and the fluid pressure supplied to the system through the first means for controlling said other means.

10. The combination in a motor vehicle having an engine, brakes and operator controlled means for controlling application and release of the brakes, of other means controlled by the speed of the engine, the speed of the vehicle and said operator controlled means for controlling the application and release of the brakes.

11. The combination in a motor vehicle having an engine, brakes and operator controlled means for controlling applying and releasing of the brakes, of other means controlled by the speed of the engine, the speed of the vehicle and the acceleration of the vehicle for controlling the application and release of the brakes.

12. In a motor vehicle having an engine, a fluid pressure braking system, a source of fluid pressure, a brake chamber, a brake valve for supplying fluid pressure from said source to said chamber, other means for supplying fluid pressure to said chamber from said source, a valve in said other means, means for operating the last named valve, and means responsive to the speed of the vehicle, the speed of the engine, and the acceleration of the vehicle for operating the last named means.

13. In a motor vehicle having an engine and a fluid pressure braking system, a source of fluid power, valve means for controlling communication between said braking system and said source, means separate from said valve means for connecting the braking system and the source, a valve in said separate means, electromagnetic means for opening said valve, a circuit for controlling the electromagnetic means comprising a plurality of switches arranged in series, a pair of speed responsive devices for operating a pair of said switches, one of said devices being responsive to the speed of the engine while the other is responsive to the speed of the vehicle, and means responsive to the acceleration of the vehicle for controlling another of said switches.

14. In an automotive vehicle having an engine, a plurality of brake actuators, a source of fluid pressure, operator controlled means for supplying fluid pressure from said source to said actuators, auxiliary means for supplying fluid pressure from said source to said actuators, a valve in said auxiliary means, means for opening said valve, and means responsive to the speed of the vehicle, the speed of the engine, and the fluid pressure supplied by said operator controlled means for operating the last named means.

15. In a motor vehicle having an engine and a fluid pressure braking system, a source of fluid pressure, valve means for controlling the communication between said braking system and source, means separate from said valve means for connecting the braking system and source, a valve in said separate means, electromagnetic means for opening said valve, and a circuit for controlling the electromagnetic means comprising a plurality of switches arranged in series, one of said switches being controlled in accordance with the speed of the vehicle, another being controlled by the speed of the engine and still another being controlled by the fluid pressure supplied to the system through said valve means.

16. In a motor vehicle having an engine and a fluid pressure braking system, a source of fluid pressure, valve means for controlling the communication between said braking system and source, means separate from said valve means for connecting the braking system and source, a valve in said separate means, electromagnetic means for opening said valve, and a circuit for controlling the electromagnetic means comprising a plurality of switches arranged in series, one of said switches being controlled in accordance with the speed of the vehicle, another being controlled by the speed of the engine and still another being controlled by said valve means.

17. In a motor vehicle having an engine and a fluid pressure braking system, a source of fluid pressure, valve means for controlling the communication between said braking system and source, means separate from said valve means for connecting the braking system and source, a valve in said separate means, electromagnetic means for opening said valve, and a circuit for controlling the electromagnetic means comprising a plurality of switches arranged in series, one of said switches being controlled in accordance with the speed of the vehicle, another being controlled by the speed of the engine and still another being controlled by means responsive to the acceleration of the vehicle.

WILFRED A. EATON.